3,663,626
HYDROGENATION OF ARYLALDEHYDES
Joseph T. Arrigo, Mount Prospect, and Nils J. Christensen, Palatine, Ill., assignors to Universal Oil Products Company, Des Plaines, Ill.
No Drawing. Filed May 1, 1969, Ser. No. 821,092
Int. Cl. C07c 29/14
U.S. Cl. 260—613 D                                5 Claims

ABSTRACT OF THE DISCLOSURE

A continuous process for the hydrogenation of arylaldehydes to the corresponding alcohols effected in contact with a catalyst composite of platinum and alkali metal component.

BACKGROUND OF THE INVENTION

The catalytic hydrogenation of arylaldehydes heretofore has been accomplished primarily in batch systems. Batch type operations suffer the inherent disadvantages involved in obtaining intimate contact between the liquid reactant, gaseous hydrogen and solid catalyst particles, as well as the necessity of separating the solid catalyst from the effluent reaction products and recovering the desired alcohol. In addition, batch operations must be terminated after each run, which generally is of comparatively short duration, and accordingly batch type operations do not permit economical manufacture.

DESCRIPTION OF THE INVENTION

The objections hereinbefore set forth to the batch process are avoided by the novel process of the present invention, which effects the hydrogenation in a continuous manner. It now has been found that the desired hydrogenation is accomplished when using a particular catalyst composite as will be hereinafter described in detail.

In one embodiment the present invention relates to a continuous process for the hydrogenation of an arylaldehyde to the corresponding alcohol by effecting in a continuous process the hydrogenation in contact with a catalyst composite of platinum and an alkali metal component.

In a specific embodiment the present invention relates to a continuous process for the hydrogenation of anisaldehyde to anisyl alcohol which comprises effecting in a continuous process the hydrogenation at a temperature of from about 50° to about 200° C. under a hydrogen pressure of from about 200 to about 2000 p.s.i.g. in contact with a catalyst composite of platinum, alumina and lithium oxide.

As hereinbefore set forth, the process of the present invention is effected in contact with a catalyst composite of platinum and an alkali metal component. The catalyst composite is prepared in any suitable manner and preferably is of the supported type. Any suitable support or carrier may be employed including alumina, charcoal, etc. Alumina is particularly preferred and, while any suitable alumina may be employed, the alumina more particularly is substantially pure alumina as prepared by the digestion of aluminum pellets with a mineral acid such as hydrochloric acid or sulfuric acid. The alumina preferably is formed into particles of uniform size and shape, such as spheres, pellets, etc. and dried and calcined. While the uniform particles are preferred, it is understood that the alumina also may be in the form of irregular size and shape. In a preferred method, the platinum component is composited with the shaped alumina particles, which is effected in any suitable manner. In one method this is effected by soaking the alumina particles in a suitable platinum containing solution, as, for example, platinic chloride, chloroplatinic acid, etc. and then drying, generally at a temperature of from about 100° to about 260° C., followed by, when desired, calcination at a temperature of from about 400° to about 650° C. The impregnation of the platinum component is controlled to composite the platinum in a concentration within the range of from about 0.1% to about 5% and preferably from about 0.5% to about 3% by weight of the final catalyst, although lower and more particularly higher concentrations may be used when desired. While it is believed that the platinum is present in the catalyst as the metal, it is understood that the platinum may be present as a compound thereof.

The platinum-alumina composite prepared in the above manner then is treated to composite the alkali metal component therewith. A particularly preferred component is lithium oxide. Other alkali metal components include sodium, potassium, rubidium, and cesium, although the last two are more expensive and generally are not preferred. The alkali metal component may be composited in any suitable manner as, for example, by soaking the platinum-alumina particles in a solution of a suitable salt of the alkali metal as, for example, the nitrate, acetate, carbonate, bicarbonate, phosphate, etc. In a particularly preferred method, the platinum-alumina particles are soaked in a solution of lithium nitrate, followed by drying and calcining at the temperatures hereinbefore set forth and for a sufficient time to effect the desired impregnation. The alkali metal component, determined as the metal, will be in a concentration of from about 0.1% to about 10% and preferably from about 0.35% to about 7% of the final catalyst, although lower and more particularly higher concentrations may be used when desired. It is believed that the alkali metal component is present in the oxide form. However, it is understood that the alkali metal component may be present in any other suitable form. Regardless of the particular forms, the concentrations as herein set forth for this component are on the basis of the free metal.

The alumina generally is considered as an inert support or carrier. However, in combination with the platinum and alkali metal component, the alumina may exert a contributing catalytic effect. Furthermore, the platinum component is peculiar for this reaction and the combination thereof with the alkali metal component results in a mutually-contributing effect to produce the desired results. Furthermore the particular catalyst composite is coordinated with the preferred operating conditions to be hereinafter set forth to obtain the desired high conversion and high selectivity.

As hereinbefore set forth, the process of the present invention is effected in a continuous system and thus enjoys the inherent benefits of economy, convenience and uninterrupted operation. The process is readily effected by disposing the catalyst as a fixed bed in a reaction zone and passing the reactants at the desired temperature and pressure, either together or separately and either in upward or downward flow, through the catalyst bed. The hydrogenation is effected at any suitable temperature, which generally will be within the range of from about 50° to about 200° C. and preferably is within the range of from about 80° to about 150° C., utilizing a hydrogen pressure of from about 200 to about 2000 p.s.i.g. and preferably from about 1000 to about 1500 p.s.i.g. The charge rate generally will be within the range of from about 0.1 to about 5 LHSV, based on the aldehyde charge, and preferably is within the range of from about 0.25 to about 2 LHSV. The LHSV is defined as the volume of charge per volume of catalyst per hour. The effluent products from the reaction zone are passed into a separator, wherefrom excess hydrogen is vented or recycled, in all or in part, to the reaction zone and wherefrom the liquid products then are passed into suitable recovery equipment. When the arylaldehyde is solid at ambient temperature, it may be heated to melting and pumped into the reaction zone or, when desired, the arylaldehyde may be dissolved in a suitable solvent and charged to the process in this manner. Any suitable inert solvent may be used including alcohol, particularly methanol, ethanol, propanol, etc., hydrocarbon, particularly benzene or toluene, etc. It is another advantage to the present invention that a solvent need not be used, thus avoiding the necessity of subsequent separation of the solvent from the desired product. When the aryl alcohol product is solid or nearly so at ambient temperature, it is understood that the separator, other recovery and storage equipment, as well as the inter-connecting piping, will be heated to maintain the aryl alcohol in liquid state.

The continuous process of the present invention is used for the hydrogenation of any arylaldehyde to prepare the corresponding alcohol. In a particularly preferred embodiment, the present invention is used for the hydrogenation of anisaldehyde to anisyl alcohol, the latter being an aroma chemical of considerable importance. Other arylaldehydes which may be hydrogenated in accordance with the present invention include benzaldehyde, tolualdehyde, salicylaldehyde, vanillin, phenylacetaldehyde, phenylpropionaldehyde, cinnamaldehyde, phenylbutyraldehyde, naphthyl aldehyde, naphthyl aliphatic aldehydes, anthraldehyde, anthryl aliphatic, aldehydes, etc. When the arylaldehyde contains unsaturation in the aliphatic moiety, the unsaturation generally will be hydrogenated simultaneously with the hydrogenation of the aldehyde function. The specific aldehydes set forth above are for illustrative purposes, with the understanding that other arylaldehydes, which may or may not contain substituents attached to the nucleus, may be hydrogenated in accordance with the present invention. In general, the substituents on the nucleus will be selected from hydrocarbyl, including aliphatic, aryl, alkaryl, arylalkyl, cycloalkyl, etc., amino, alkylamino, diakylamino, alkylmercapto, hydroxy, alkoxy, aryloxy, etc.

The following examples are introduced to illustrate further the novelty and utility of the present invention but not with the intention of unduly limiting the same.

Example I

Both the selectivity and the conversion are important in producing the desired product of high purity. Selectivity, as used in the present examples, is defined as the weight of desired product divided by the weight of the charge converted, multiplied by 100. Conversion is defined as the weight of the charge converted, divided by the weight of the charge multiplied by 100. Accordingly, the objective is to obtain maximum selectivity at essentially complete conversion.

A series of runs was made in a continuous manner using anisaldehyde as the charge. The anisaldehyde and hydrogen were passed downwardly through an externally-heated reaction zone containing a bed of the catalyst. The effluent products from the reaction zone were passed into a high pressure receiver wherefrom hydrogen was vented. The liquid product was analyzed by GLC to determine the conversion and selectivity as specified above.

In the first example the catalyst was a composite of 0.75% by weight of platinum, alumina and 5% by weight of lithium as the oxide. The catalyst was in the form of 1/16 inch spheres. This run was made at a reactor temperature of 149° C., a hydrogen pressure of 1500 p.s.i.g., hydrogen charged at the rate of 2.2 cubic feet per hour and the anisaldehyde charged at a LHSV of 0.25. Based on GLC analysis, the ocnversion was 99 and the selectivity was 95.

Example II

Another continuous run was made in substantially the same manner as described in Example I except that the catalyst contained 5.4% by weight of lithium (as the oxide) and the reactor temperature was 100° C. In this run the catalyst was in the form of 20–40 mesh particles. All other conditions were the same as described in Example I. Based on GLC analysis, the conversion was 100 and the selectivity was 98.

Example III

Another continuous run was made in substantially the same manner as described in the previous examples. In this run the catalyst comprised 0.75% by weight of platinum and 2% by weight of lithium (as the oxide) composited with alumina, in the form of 40–60 mesh particles. This run was made at a temperature of 100° C., 1000 p.s.i.g. hydrogen pressure, LHSV of 0.5, with the hydrogen being charged at a rate of 0.25 cubic feet per hour. The conversion amounted to 98 and the selectivity was 92.

Example IV

The arylaldehyde compound of this example is p-t-butyl-alpha-methylcinnamaldehyde. It is subjected to hydrogenation in a continuous process as hereinbefore described, utilizing a catalyst composite of 1% platinum, 3% lithium as the oxide and alumina, a temperature of 120° C., a hydrogen pressure of 1500 p.s.i.g. and a LHVS of 0.2.

Example V

In this example, benzaldehyde is hydrogenated to benzyl alcohol in a continuous process as hereinbefore described. The hydrogenation is effected in contact with the catalyst of Example I, at a temperature of 100° C., a hydrogen pressure of 1200 p.s.i.g. and a LHSV of 0.2.

We claim as our invention:

1. A continuous process for the hydrogenation of an arylaldehyde to the corresponding alcohol which comprises subjecting said aldehyde to hydrogenation in a continuous process in contact with a catalyst composite of platinum, alumina and lithium component.

2. The process of claim 1 in which said arylaldehyde is anisaldehyde.

3. The process of claim 1 in which said platinum is in a concentration of from about 0.1% to about 5% by weight of the catalyst composite.

4. The process of claim 1 in which said lithium component is lithium oxide in a concentration, determined as the free metal, of from about 0.1% to about 10% by weight of the catalyst composite.

5. The process of claim 1 in which said lithium component is lithium oxide in a concentration, determined as the free metal, of from about 0.35% to about 7% by weight of the final catalyst composite.

References Cited

UNITED STATES PATENTS 2,822,403   2/1958   Hopff et al. _____ 260—618 H

OTHER REFERENCES

Carothers et al.: JACS, vol. 46 (1924), 1675–1683.
Carothers et al.: JACS, vol. 47 (1925), 1047–1057.

BERNARD HELFIN, Primary Examiner

U.S. Cl. X.R.

260—613 R, 618 H, 574, 609 D